United States Patent
Lee et al.

(10) Patent No.: US 8,637,191 B2
(45) Date of Patent: Jan. 28, 2014

(54) LITHIUM SECONDARY BATTERY INCLUDING WATER-DISPERSIBLE BINDER, CONDUCTION AGENT, AND FLUOROETHYLENECARBONATE

(75) Inventors: Kwan Soo Lee, Daejeon (KR); Cha Hun Ku, Daejeon (KR); Duk Hyun Ryu, Daejeon (KR); Jung Jin Kim, Daejeon (KR); Byung Kyu Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/909,267

(22) Filed: Oct. 21, 2010

(65) Prior Publication Data

US 2011/0091775 A1 Apr. 21, 2011

Related U.S. Application Data

(63) Continuation of application No. PCT/KR2010/004688, filed on Jul. 19, 2010.

(30) Foreign Application Priority Data

Jul. 17, 2009 (KR) ........................ 10-2009-0065418

(51) Int. Cl.
- *H01M 10/0569* (2010.01)
- *H01M 4/13* (2010.01)
- *H01M 4/62* (2006.01)

(52) U.S. Cl.
USPC ........... 429/331; 429/329; 429/327; 429/326; 429/217; 429/232

(58) Field of Classification Search
USPC .............. 429/231.8, 324, 326, 327, 329, 330, 429/331, 336, 337, 338; 252/62.2
See application file for complete search history.

(56) References Cited

U.S. PATENT DOCUMENTS

| | | | |
|---|---|---|---|
| 6,420,070 B1 * | 7/2002 | Kasamatsu et al. | 429/231.8 |
| 6,506,524 B1 * | 1/2003 | McMillan et al. | 429/324 |
| 6,589,694 B1 * | 7/2003 | Gosho et al. | 429/231.1 |

(Continued)

FOREIGN PATENT DOCUMENTS

| KR | 10-2001-0055968 A | 7/2001 |
|---|---|---|
| KR | 10-2006-0001743 A | 1/2006 |

(Continued)

OTHER PUBLICATIONS

McMillan et al., Fluoroethylene carbonate electrolyte and its use in lithium ion batteries with graphite anodes, 1999, Journal of Power Sources, vol. 81-82, p. 20-26.*

(Continued)

*Primary Examiner* — Barbara Gilliam
*Assistant Examiner* — Robert S Carrico
(74) *Attorney, Agent, or Firm* — Birch, Stewart, Kolasch & Birch, LLP

(57) ABSTRACT

The present invention relates to a lithium secondary battery. The present invention provides the lithium secondary battery including a positive electrode, a negative electrode, and a non-aqueous electrolyte solution. The negative electrode includes a water-dispersible binder and a conduction agent. The non-aqueous electrolyte solution includes fluoroethylenecarbonate (FEC). The batteries of the present invention are advantageous in that they have a high efficiency charging lifespan characteristic and enable high capacity charging in a short time.

2 Claims, 1 Drawing Sheet

(56) References Cited

U.S. PATENT DOCUMENTS

| | | | |
|---|---|---|---|
| 2006/0003232 A1* | 1/2006 | Jung et al. | 429/330 |
| 2007/0148541 A1* | 6/2007 | Wakita et al. | 429/200 |
| 2007/0231700 A1* | 10/2007 | Watanabe | 429/246 |

FOREIGN PATENT DOCUMENTS

| | | |
|---|---|---|
| KR | 10-2006-0001744 A | 1/2006 |
| KR | 10-0709207 B1 | 4/2007 |
| KR | 10-0709838 B1 | 4/2007 |
| KR | 10-2008-0038806 A | 5/2008 |
| KR | 10-2008-0110535 A | 12/2008 |
| KR | 10-2008-0111139 A | 12/2008 |

OTHER PUBLICATIONS

Lee, J.H., "The aqueous processing of natural graphite particulates for lithium ion battery anodes and their electrochemical performance," 2005, Hanyang University, pp. 1-69.

* cited by examiner

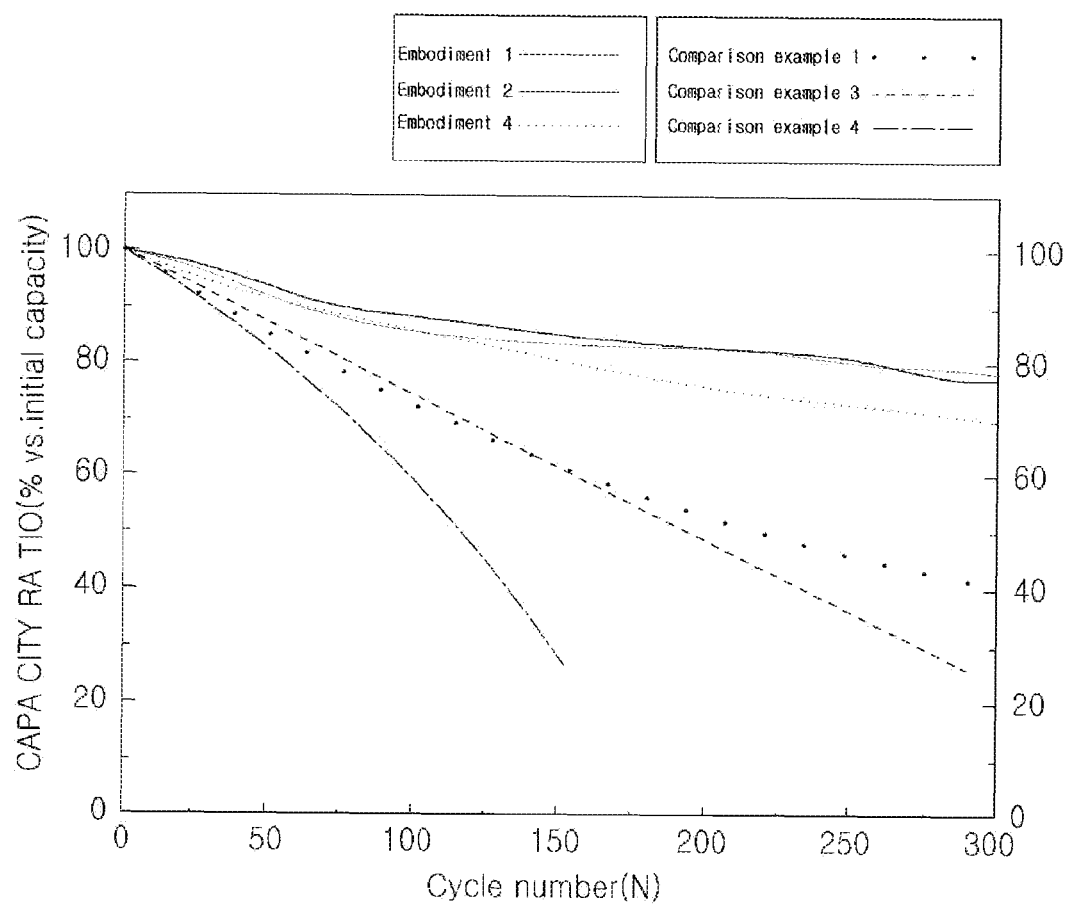

LITHIUM SECONDARY BATTERY INCLUDING WATER-DISPERSIBLE BINDER, CONDUCTION AGENT, AND FLUOROETHYLENECARBONATE

CROSS REFERENCE TO RELATED APPLICATIONS

This application is a Continuation of PCT International Application No. PCT/KR2010/004688 filed on Jul. 19, 2010, which claims the benefit of Patent Application No. 10-2009-0065418 filed in Republic of Korea, on Jul. 17, 2009. The entire contents of all of the above applications is hereby incorporated by reference into the present application.

BACKGROUND OF THE INVENTION

1. Field of the Invention

The present invention relates to a lithium secondary battery having a high efficiency charging lifespan characteristic and enabling high capacity charging in a short time and, more particularly, to a lithium secondary battery including a water-dispersible binder, a conduction agent, and fluoroethylenecarbonate.

2. Discussion of the Related Art

Today, commercial electrode binders chiefly used to fabricate secondary batteries include polyvinyllidene fluoride (hereinafter referred to as 'PVDF')-based polymers, PVDF homopolymers, polyvinylidene fluoride hexafluoropropylene copolymers (Korean Patent Application Publication No. 2001-0055968), and polyvinyllidene flouride-chlotrifluoroethylene copolymers.

The PVDF-based polymers are advantageous that they are stable chemically and electrochemically, but may have environmental problems resulting from organic solvents, such as NMP (N-methyl-2-pyrrolidone), because they have to be dissolved in the organic solvents and used as binder compositions.

Further, the PVDF-based polymers are dangerous because of a low safety and become the root cause of a reduction in the performance of electrodes due to a low affinity with a liquid electrolyte.

In addition, the PVDF-based polymers are excellent in the binding characteristic with inorganic substance particles, such as active materials, because they act with it surrounding the circumference of the active materials, but are disadvantageous it that they must be used in a large quantity in order to exhibit and maintain sufficient adhesive strength because they have poor adhesive strength with a current collector such as metal.

In order to solve the above problems, a water-dispersible electrode composition using water as a dispersion medium (i.e., a solvent) was proposed. In this case, a water-dispersible binder is used instead of the above-described PVDF-based binder. Styrenebutadiene rubber (SBR) is chiefly used as the water-dispersible binder. In an electrode using the water-dispersible binder, a binding effect is higher than that of a non-aqueous (i.e., an organic solvent-based) binder although the water-dispersible binder is used in a small quantity and thus the ratio of presence of active materials per the same volume can be increased, thereby being capable of achieving a high capacity and a long lifespan characteristic. Accordingly, it is expected that batteries adopting negative electrodes using the water-dispersible binder will become the main stream in the future.

For a conventional process of fabricating the negative electrodes of a secondary battery using water as a dispersion medium, reference can be made to a document 1 below. The document 1 discloses influence of carboxymethyl cellulose (CMC) and styrene butadiene rubber (SBR) on the stability of suspensions in a process of fabricating water-based suspensions of natural graphite which is a material for a lithium ion battery negative electrode; electrokinetic behavior and flexible behavior in order to evaluate the dispersion stability of suspensions according to organic additives; a shaping micro structure and a pore ratio of as-castsheet and correlation therebetween, etc.

[Document 1] Jin-Hyon Lee, [Process of fabricating water-based suspensions of materials for negative electrodes of lithium ion batteries and evaluation of battery characteristics], a thesis for a master's degree, Hanyang University, 2005.

SUMMARY OF THE INVENTION

As described above, in order to solve the conventional problems concerned with the negative electrode fabricated using a non-aqueous solvent, a technique in which a negative electrode is fabricated using a water-dispersible solvent was proposed, but no problem does not exist in the technique.

The negative electrode using water as a solvent of an electrode slurry and also using a water-dispersible binder is advantageous in that an additional conduction agent needs not to be used in the electrode because of an excellent conduction characteristic, but is problematic in that if several conditions are not optimized in a process of drying the electrode, the electrical conductivity of the electrode is reduced.

Further, the conventional negative electrode using a water-dispersible binder is also problematic in that satisfactory performance is not met even in a high efficiency charging lifespan characteristic and a high capacity charging speed per unit time.

Accordingly, the present invention has been made keeping in mind the above problems occurring in the prior art, and an object of the present invention is to provide a battery which is capable of improving the characteristics of a negative electrode by adding a conduction agent to a water-based negative electrode and of improving a high efficiency charging lifespan characteristic and enabling high capacity charging in a short time by using specific additives in an electrolyte.

The present invention has been made to solve the conventional problems and provides a lithium secondary battery including a positive electrode, a negative electrode, and a non-aqueous electrolyte solution, wherein the negative electrode comprises a water-dispersible binder and a conduction agent, and the non-aqueous electrolyte solution comprises fluoroethylenecarbonate (FEC).

Further, the present invention provides the lithium secondary battery in which the fluoroethylenecarbonate (FEC) is included in an amount of 10 to 15 wt % based on a total amount of the non-aqueous electrolyte solution including the fluoroethylenecarbonate (FEC).

Further, the present invention provides the lithium secondary battery in which ethylenecarbonate (EC) is included in an amount of 85 to 90 wt % based on a total amount of the non-aqueous electrolyte solution including the ethylenecarbonate (EC).

Further, the present invention provides the lithium secondary battery in which the conduction agent is one or a combination of two or more selected from acetylene black, carbon black, and graphite.

Further, the present invention provides the lithium secondary battery in which the conduction agent is included in an amount of 0.2 to 0.8 wt %.

Further, the present invention provides the lithium secondary battery in which the water-dispersible binder is one or a combination of two or more selected from styrene-butadiene rubber, acrylonitrile-butadiene rubber, acrylonitrile-butadiene-styrene rubber, carboxymethyl cellulose, and hydroxypropylmethyl cellulose.

BRIEF DESCRIPTION OF THE DRAWINGS

The above and other objects and features of the present invention will become apparent from the following description of some embodiments given in conjunction with the accompanying drawing, in which:

FIG. 1 is a graph showing cycle characteristics according to an embodiment of the present invention and a comparison example.

DETAILED DESCRIPTION OF THE EMBODIMENTS

Hereinafter, some embodiments of the present invention will be described in detail.

In the present invention, in a lithium secondary battery, including a positive electrode, a negative electrode, and a non-aqueous electrolyte solution, the negative electrode includes a water-dispersible binder and a conduction agent, and the non-aqueous electrolyte solution includes fluoroethylenecarbonate (FEC).

In the present invention, the negative electrode includes the water-dispersible binder.

In general, a negative electrode is fabricated by forming a negative electrode-forming mixture in which negative electrode active materials, a binder, etc. and a solvent are uniformly mixed in an appropriate ratio, coating the negative electrode-forming mixture on a current collector, and drying and compressing the result. Here, a non-aqueous solvent is chiefly used as the solvent. This is because the non-aqueous solvent is advantageous in terms of a guaranteed binding capacity between active materials.

However, the organic solvent in itself can not only lead to environmental problems, but become a fundamental cause of a reduction in the performance of an electrode because of a low affinity with a liquid electrolyte.

Accordingly, in the negative electrode of the present invention, unlike the prior art, substance fabricated using water is used as the solvent. In this case, substance widely used in a non-aqueous solvent cannot be used, but only the water-dispersible binder must be used as the binder included to bind the negative electrode active materials together.

In the present invention, conventional water-dispersible binders widely used can be unlimitedly used as the water-dispersible binder. One or a combination of two or more, selected from styrenebutadiene rubber, acrylonitrile-butadiene rubber, acrylonitrile-butadiene-styrene rubber, carboxymethyl cellulose (CMC), hydroxypropylmethyl cellulose, polyvinylalcohol, hydroxypropyl cellulose, and diacetyl cellulose, can be used as the water-dispersible binder. In particular, it is preferred that a mixture in which styrenebutadiene rubber and carboxymethyl cellulose are appropriately mixed be used as the negative electrode binder.

It is preferred that the water-dispersible binder be used in an amount of 1 to 4 wt % based on the total amount of an electrode composition including the water-dispersible binder. If the water-dispersible binder is used in an amount of less than 1 wt %, the adhesive strength of active materials is weakened, and so the active materials can be seceded in a charging and discharging process. If the water-dispersible binder is used in an amount of more than 4 wt %, the amount of active materials is reduced, which is not preferable in terms of the capacity of the battery.

Further, in the present invention, the negative electrode includes the conduction agent.

In general, in the case in which a solvent used when a negative electrode is fabricated is water (i.e., in the case of a water-dispersible solvent), an additional conduction agent is not used. This is because a negative electrode, fabricated using a water-dispersible solvent and a water-dispersible binder in itself, has an excellent conduction characteristic and so does not need to use an additional conduction agent.

However, the negative electrode using the water-dispersible solvent and the water-dispersible binder is problematic in that the conductivity of the electrode is deteriorated in a dry environment. The inventor of the present invention has found that a charging characteristic (in particular, a high efficiency charging characteristic) is improved even in a dry environment if an appropriate amount of a conduction agent is used in the negative electrode using a water-dispersible solvent and a water-dispersible binder.

Accordingly, in the present invention, the conduction agent, together with the water-dispersible binder, is included in a negative electrode.

It is preferred that the conduction agent be included in an amount of 0.2 to 0.8 wt %. If the conduction agent is included in an amount of more than 0.8 wt %, the amount of electrode active materials is reduced, which is not preferable in terms of the capacity of the battery. Further, it may not be preferable in maintaining the adhesive strength of the electrode active materials because the amount of the binder is reduced as much as an increased amount of the conduction agent. If the conduction agent is included in an amount of less than 0.2 wt %, there is a possibility that a high efficiency charging characteristic may not be achieved because conductivity is less improved.

Common substance used to fabricate electrodes can be unlimitedly used as the conduction agent. Examples of the common substance which can be used as the conduction agent can include one or a combination of two or more selected from acetylene black, carbon black, natural graphite, artificial graphite, Ketjen black, and carbon fiber. Further, a mixture of conductive materials, such as polyphenylene derivatives, can be used as the conduction agent.

The negative electrode included in the lithium secondary battery according to the present invention can be obtained by coating a mixture, including the negative electrode active materials, the water-dispersible binder, and the conduction agent, on a current collector and then drying a solvent (water).

The negative electrode active materials can include carbon and graphite materials, such as natural graphite, artificial graphite, expanded graphite, carbon fiber, non-graphitizing carbon, carbon black, carbon nanotubes, fullerenes, and activated carbon; metal, such as Al, Si, Sn, Ag, Bi, Mg, Zn, In, Ge, Pb, Pd, Pt, or Ti which can be alloyed with lithium, and a compound containing the elements; a complex of metal and a compound thereof and carbon and graphite materials; and nitrides containing lithium, but not limited thereto.

In particular, it is preferred that in order for the negative electrode active materials to be well sprayed in water (i.e., a solvent), the particle diameter of the negative electrode active materials be a nano size. More particularly, it is preferred that the particle diameter of the negative electrode active materials be 5 to 30 μm.

The negative electrode mixture is a component prohibiting the expansion of a negative electrode and it can optionally include a filler. The filler is not specially limited so long as it is fibrous materials which do not cause a chemical change of a corresponding battery. For example, olefine-based polymers, such as polyethylene and polypropylene, and fibrous materials, such as glass fiber and carbon fiber, can be used as the filler.

The fluoroethylenecarbonate (FEC) used in the non-aqueous electrolyte solution of the present invention is a component which is included in the non-aqueous electrolyte solution as an additive.

The inventor of the present invention has found that when the fluoroethylenecarbonate (FEC) is included in the non-aqueous electrolyte solution as an additive, a secondary battery has a high efficiency lifespan characteristic and enables high capacity charging per unit time. It is estimated that a dielectric constant is high when the battery is initially charged and an SEI film with excellent lithium ion conductivity can be formed because the fluoroethylenecarbonate (FEC) includes fluorine having a strong electron attraction effect. Actually, it was found that a charging characteristic per unit time and a cycle characteristic, of the battery, were improved when the fluoroethylenecarbonate (FEC) was included in the non-aqueous electrolyte solution as an additive (for this, please refer to an embodiment to be described later).

It is preferred that the fluoroethylenecarbonate (FEC) be included in an amount of 10 to 15 wt % based on the total amount of the non-aqueous electrolyte solution including the fluoroethylenecarbonate (FEC). If the fluoroethylenecarbonate (FEC) is included in an amount of less than 10 wt %, fluoroethylenecarbonate is exhausted during a long-term cycle and there is a possibility that the amount of fluoroethylenecarbonate may be insufficient in the later part of the cycle.

If the fluoroethylenecarbonate (FEC) is included in an amount of more than 15 wt %, there is a possibility that the cost of the battery can increase because of the excessive use of expensive fluoroethylenecarbonate (FEC) and the performance of the battery can be deteriorated when high efficiency discharging is performed because the resistance of a positive electrode is excessively increased.

Substance used to fabricate electrodes can be unlimitedly used as a base solvent forming a constituent component of the non-aqueous electrolyte solution, together with the fluoroethylenecarbonate (FEC). The base solvent can include one or more selected from the group comprising propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), fluoroethylene carbonate (FEC), formic methyl, formic ethyl, formic propyl, methyl acetate, ethyl acetate, propyl acetate, pentyl acetate, propionate methyl, propionate ethyl, propionate ethyl, and propionate butyl. In an embodiment of the present invention, ethylenecarbonate (EC) of 85 to 90 wt % was used as the base solvent.

Further, the non-aqueous an electrolyte can further include other additives in order to improve a charging/discharging characteristic, flame retardant, etc. Examples of other additives can include pyridine, triethylphosphite, triethanolamine, cyclic ether, ethylene diamine, n-glyme, hexaphosphoric triamide, nitrobenzene derivatives, sulfur, quinone imine dyes, N-substitution oxazolidinone, N,N-substitution imidazolidine, ethylene glycol dialkyl ether, ammonium salts, pyrrole, 2-methoxy ethanol, and trichloro aluminum. In some cases, a solvent containing halogen, such as carbon tetrachloride or ethylene trifluoride, can be further included in order to assign noninflammability and dioxide carbonic gas may be further included in order to improve a high-temperature preservation characteristic.

The remaining components of the lithium secondary battery according to the present invention are described below.

The positive electrode can be fabricated by coating a mixture of positive electrode active materials, a conduction agent, and a binder on a positive electrode current collector and drying the result. In some cases, a filler may be further included in the mixture.

The positive electrode active materials can include a stratified compound, such as lithium cobalt oxide ($LiCoO_2$) and lithium nickel oxide ($LiNiO_2$), or a compound in which one or more transition metals are substituted; lithium manganese oxides such as a Chemical Formula $Li_{1+x}Mn_{2-x}O_4$ (where x is 0 to 0.33), $LiMnO_3$, $LiMn_2O_3$, and $LiMnO_2$; lithium copper oxides ($Li_2CuO_2$); vanadium oxides such as $LiV_3O_8$, $LiFe_3O_4$, $V_2O_5$, and $Cu_2V_2O_7$; Ni-site type lithium nickel oxides represented by a Chemical Formula $LiNi_{1-x}MxO_2$ (where M=Co, Mn, Al, Cu, Fe, Mg, B, or Ga and x=0.01 to 0.3); lithium manganese complex oxides represented by a Chemical Formula $LiMn_{2-x}M_xO_2$ (where M=Co, Ni, Fe, Cr, Zn, or Ta and x=0.01 to 0.1) or $Li_2Mn_3MO_8$ (where M=Fe, Co, Ni, Cu, or Zn); $LiMn_2O_4$ in which some of Li of the above chemical formula is substituted with alkaline-earth metal ions; a disulfide compound; $Fe_2(MoO_4)_3$, and so on, but not limited thereto.

In general, the positive electrode current collector is made in a thickness range of 3 to 500 μm. The positive electrode current collector is not specially limited so long as it does not cause a chemical change in a corresponding battery and has high conductivity. For example, stainless steel, aluminum, nickel, titanium, elementary carbon, or aluminum, or a current collector in which carbon, nickel, titanium, or silver is processed on the surface of stainless steel can be used as the positive electrode current collector. The current collector may have minute irregularities on its surface in order to increase the adhesive strength of positive electrode active materials, but may have a variety of forms, such as a film, a sheet, foil, a net, porous materials, foaming materials, and non-woven reticulum.

A binder for the positive electrode active materials is a component assisting the bond of active materials and a conduction agent and the bond for the current collector. In general, the binder is used in an amount of 1 to 50 wt % based on the total amount of a positive electrode mixture included the binder. High molecular polyacrylonitrile-acrylic copolymers can be used as the binder, but not limited thereto. Another example of the binder can include polyvinyllidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer termini (EPDM), sulfonated EPDM, styrene butylene rubber, fluorine rubber, and a variety of copolymers.

Other conduction agent and filler are the same as that described above in relation to the negative electrode.

The separation film is interposed between the positive electrode and the negative electrode. An insulating thin film having a high ion permeability and high mechanical strength is used as the separation film. In general, the separation film has a pore diameter of 0.01 to 10 μm and a thickness of 5 to 300 μm. For example, olefine-based polymers, such as chemical-resistant and hydrophobic polypropylene, a sheet or non-woven fabric made of glass fiber or polyethylene, or the like can be used as the separation film.

The secondary battery of the present invention can be fabricated by including an electrode assembly in which the positive electrode and the negative electrode, together with the separation film, are alternately laminated in an exterior casing, such as a battery casing, using an electrolyte and then sealing the result. A typical method can be unlimitedly used as a method of fabricating the secondary battery.

Hereinafter, embodiments of the present invention are descried in detail below. The following embodiments are intended to help understanding of the present invention, and it should be noted that the following embodiments are not intended to limit the scope of the present invention.

Embodiment 1

Fabrication of Negative Electrode

Conductive carbon was put in a composition in which graphite and a binder were mixed, and the composition was dispersed in water, thereby fabricating a slurry (where graphite:binder (SBR):conductive carbon (Super-P)=98.6:1:0.4 wt %). The slurry was coated on copper foil, sufficiently dried at a temperature of 130° C., and then pressed, thereby fabricating the negative electrode. The negative electrode had a thickness of about 135 μm.

(Fabrication of Positive Electrode)

A slurry was fabricated through dispersion in NMP (where $LiCoO_2$:carbon black:PVdF=95:2.5:2.5 wt %). The slurry was coated on aluminum foil, sufficiently dried at a temperature of 130° C., and then pressed, thereby fabricating the positive electrode. The positive electrode had a thickness of about 140 μm.

(Fabrication of Battery)

A polypropylene separation film was laminated between the positive electrode and the negative electrode and received in the battery casing. Next, an electrolyte (where ethylenecarbonate (EC):fluoroethylenecarbonate (FEC)=90:10 wt %) was injected into the battery casing and the battery casing was then sealed, thereby finally fabricating the battery.

Embodiment 2

Fabrication of Negative Electrode and Positive Electrode

The same as the embodiment 1.
(Fabrication of Battery)

A polypropylene separation film was laminated between the positive electrode and the negative electrode and received in the battery casing. Next, an electrolyte (where ethylenecarbonate (EC):fluoroethylenecarbonate (FEC)=85:15 wt %) was injected into the battery casing and the battery casing was then sealed, thereby finally fabricating the battery.

Embodiment 3

Fabrication of Negative Electrode

Conductive carbon was put in a composition in which graphite and a binder were mixed, and the composition was dispersed in water, thereby fabricating a slurry (where graphite:binder (SBR):conductive carbon (Super-P)=95.6:4:0.4 wt %). The slurry was coated on copper foil, sufficiently dried at a temperature of 130° C., and then pressed, thereby fabricating the negative electrode. The negative electrode had a thickness of about 135 μm.

(Fabrication of Positive Electrode and Battery)

The same as the embodiment 1.

Embodiment 4

Fabrication of Negative Electrode and Positive Electrode

The same as the embodiment 3.
(Fabrication of Battery)

A polypropylene separation film was laminated between the positive electrode and the negative electrode and received in the battery casing. Next, an electrolyte (where ethylenecarbonate (EC):fluoroethylenecarbonate (FEC)=85:15 wt %) was injected into the battery casing and the battery casing was then sealed, thereby finally fabricating the battery.

Comparison Example 1

Fabrication of Negative Electrode

A slurry was fabricated by dispersing graphite:binder (SBR)=97:3.0 wt % in water. The slurry was coated on copper foil, sufficiently dried at a temperature of 130° C., and then pressed, thereby fabricating the negative electrode. The negative electrode had a thickness of about 135 μm.

(Fabrication of Positive Electrode)

A slurry was fabricated by dispersing $LiCoO_2$:carbon black:PVdF=95:2.5:2.5 wt % in the NMP. The slurry was coated on copper foil, sufficiently dried at a temperature of 130° C., and then pressed, thereby fabricating the positive electrode. The positive electrode had a thickness of about 140 μm.

(Fabrication of Battery)

A polypropylene separation film was laminated between the positive electrode and the negative electrode and received in the battery casing. Next, an ethylenecarbonate (EC) electrolyte was injected into the battery casing and the battery casing was then sealed, thereby finally fabricating the battery.

Comparison Example 2

Fabrication of Negative Electrode

A slurry was fabricated by dispersing graphite:binder (SBR):conductive carbon (Super-P)=98.6:1:0.4 wt % in water. The slurry was coated on copper foil, sufficiently dried at a temperature of 130° C., and then pressed, thereby fabricating the negative electrode. The negative electrode had a thickness of about 135 μm.

(Fabrication of Positive Electrode)

The same as the comparison example 1.
(Fabrication of Battery)

A polypropylene separation film was laminated between the positive electrode and the negative electrode and received in the battery casing. Next, an electrolyte (where ethylenecarbonate (EC):fluoroethylenecarbonate (FEC)=80:20) was injected into the battery casing and the battery casing was then sealed, thereby finally fabricating the battery.

Comparison Example 3

Fabrication of Negative Electrode

A slurry was fabricated by dispersing graphite:binder (SBR):conductive carbon (Super-P)=99.6:0:0.4 wt % in water. The slurry was coated on copper foil, sufficiently dried at a temperature of 130° C., and then pressed, thereby fabricating the negative electrode. The negative electrode had a thickness of about 135 μm.

(Fabrication of Positive Electrode)

The same as the comparison example 1.

(Fabrication of Battery)

A polypropylene separation film was laminated between the positive electrode and the negative electrode and received in the battery casing. An electrolyte (where ethylenecarbonate (EC):fluoroethylenecarbonate (FEC)=90:10 wt %) was injected into the battery casing and the battery casing was then sealed, thereby finally fabricating the battery.

Comparison Example 4

Fabrication of Negative Electrode

A slurry was fabricated by dispersing graphite:binder (SBR):conductive carbon (Super-P)=92.6:7:0.4 wt % in water. The slurry was coated on copper foil, sufficiently dried at a temperature of 130° C., and then pressed, thereby fabricating the negative electrode. The negative electrode had a thickness of about 135

(Fabrication of Positive Electrode and Battery)

The same as the comparison example 3.

The negative electrodes of the embodiments and the comparison examples and the compositions of the electrolytes are listed in Table 1 below.

TABLE 1

| | Negative electrode | | | Electrolyte | |
|---|---|---|---|---|---|
| | Graphite | Binder (SBR) | Conductive carbon | EC | FEC |
| Embodiment 1 | 98.6 | 1 | 0.4 | 90 | 10 |
| Embodiment 2 | 98.6 | 1 | 0.4 | 85 | 15 |
| Embodiment 3 | 95.6 | 4 | 0.4 | 90 | 10 |
| Embodiment 4 | 95.6 | 4 | 0.4 | 85 | 15 |
| Comparison example 1 | 97 | 3 | 0 | 100 | 0 |
| Comparison example 2 | 98.6 | 1 | 0.4 | 80 | 20 |
| Comparison example 3 | 99.6 | 0 | 0.4 | 90 | 10 |
| Comparison example 4 | 92.6 | 7 | 0.4 | 90 | 10 |

(Unit: wt %)

Charging and discharging experiments were performed on the batteries according to the comparison examples and the embodiments, fabricated using the respective compositions. In order to increase the accuracy of the experiments, the batteries of the embodiments were fabricated for every pair using the same method, and the same experiment was repeated. Conditions for the charging and discharging experiments are as follows, and the results of the experiments are listed in FIG. 1 and Table 2.

*Conditions for the Charging and Discharging Experiments

Charging: CC/CV mode, 1.3 C/4.2 V, and end current 50 mA

Discharging: CC mode and 1.0 C/3.0 V cut-off

TABLE 2

| | Test | Charging Capacity % At 30 min | Charging Capacity % At 40 min | Charging Capacity % At 1 hr |
|---|---|---|---|---|
| Embodiment 1 | 3.0~4.2 V, 1.3 C | 65.0 | 81.6 | 94.2 |
| Embodiment 2 | | 65.1 | 81.6 | 94.2 |
| Embodiment 3 | | 65.2 | 80.1 | 93.1 |
| Embodiment 4 | | 65.2 | 80.0 | 92.9 |
| Comparison example 1 | | 62.0 | 76.0 | 88.0 |
| Comparison example 2 | | 63.0 | 76.9 | 89.2 |
| Comparison example 3 | | 58.5 | 71.3 | 80.4 |
| Comparison example 4 | | 61.4 | 75.6 | 86.2 |

(Unit: wt %)

As shown in Table 2, the batteries of the embodiments have a higher charging ratio per unit time than those of the comparison examples. As shown in FIG. 1, the batteries of the embodiments had an excellent cycle characteristic as compared with the comparison examples.

The batteries of the present invention are advantageous in that they have a high efficiency charging lifespan characteristic and enable high capacity charging in a short time.

While the invention has been shown and described with respect to the some exemplary embodiments, it will be understood by those skilled in the art that various changes and modifications may be made without departing from the spirit and scope of the invention as defined in the following claims.

What is claimed is:

1. A lithium secondary battery including a positive electrode, a negative electrode, and a non-aqueous electrolyte solution, wherein
   the negative electrode comprises a negative electrode composition including a negative electrode active material, a water-dispersible binder and a conduction agent,
   the water-dispersible binder is included in an amount of 1 wt % to 4 wt % based on a total amount of the negative electrode composition and the conduction agent is included in an amount of 0.4 wt % based on a total amount of the negative electrode composition,
   wherein the non-aqueous electrolyte solution comprises 10 wt % to 15 wt % of fluoroethylenecarbonate (FEC) based on a total amount of the non-aqueous electrolyte solution and 85 wt % to 90 wt % of ethylenecarbonate (EC) based on a total amount of the non-aqueous electrolyte solution,
   wherein the conduction agent is carbon black, and
   wherein the water-dispersible binder is styrene-butadiene rubber.

2. The lithium secondary battery of claim wherein the negative electrode active material has a particle diameter of 5 to 30 μm.

* * * * *